Nov. 4, 1969  KUNITOSHI TEZUKA  3,476,372
MELTING DEVICE FOR REGENERATING RECOVERED SCRAP IRON
Filed Feb. 24, 1967  2 Sheets-Sheet 1

INVENTOR
KUNITOSHI TEZUKA
BY
AGENT

Nov. 4, 1969 KUNITOSHI TEZUKA 3,476,372
MELTING DEVICE FOR REGENERATING RECOVERED SCRAP IRON
Filed Feb. 24, 1967 2 Sheets-Sheet 2
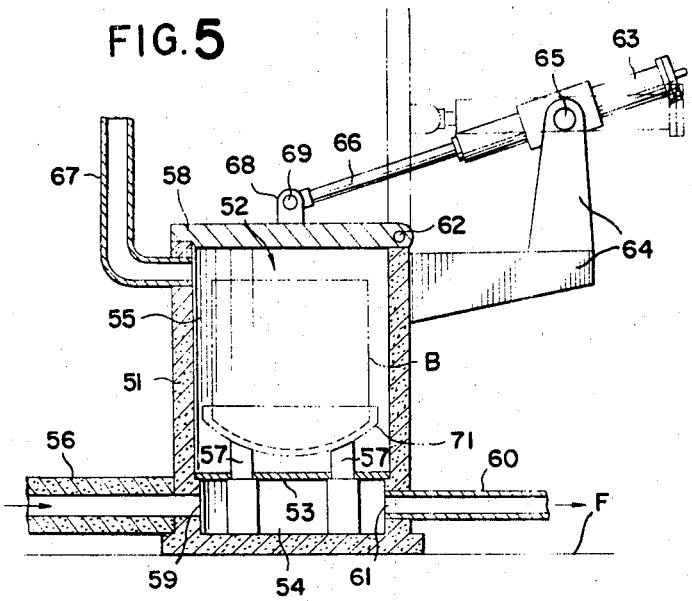
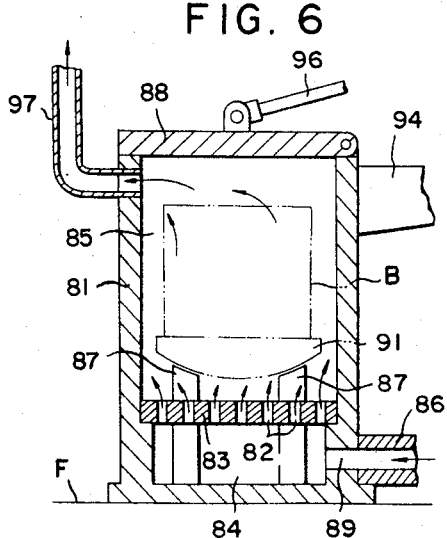
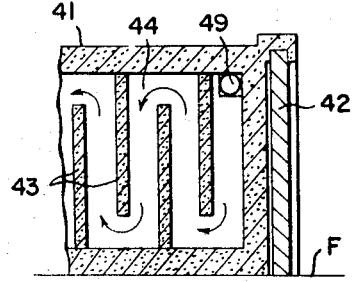
INVENTOR
KUNITOSHI TEZUKA
BY
AGENT United States Patent Office 3,476,372
Patented Nov. 4, 1969

3,476,372
MELTING DEVICE FOR REGENERATING
RECOVERED SCRAP IRON
Kunitoshi Tezuka, 34, 7-chome Minamisuna-machi,
Koto-ku, Tokyo, Japan
Filed Feb. 24, 1967, Ser. No. 618,444
Claims priority, application Japan, June 2, 1966,
41/35,100; July 18, 1966, 41/46,712
Int. Cl. C21b 1/10; F27d 13/00
U.S. Cl. 266—13                                8 Claims

ABSTRACT OF THE DISCLOSURE

Device for carrying out a preheating process, before the actual melting of scrap iron, for regenerating various kinds of scrap iron.

---

Recovered scrap iron usually has adhering thereto moisture, oily matter such as paint, machine oil and the like, or rubber, synthetic resin, nonferrous matter such as aluminum, zinc and the like. When such scrap iron, particularly when moistened, and scrap removed in cold districts and having some ice, snow or the like thereon, are placed into an electric furnace for melting, a disaster such as an explosion or the like may be caused because of the moisture.

The purity of the resulting regenerated iron is furthermore lowered on account of the other impurities. What is more, the melting process in the above cases requires a long time, in addition to the fact that a great deal of electric power is consumed. Coupled with these facts, regeneration efficiency is markedly lowered and the costs are substantially increased.

One of the important objects of the present invention is to provide a scrap-iron regenerating device for carrying out a preheating process which excludes dangers such as an explosion or the like, and will realize a substantial reduction of the time required in the actual melting process.

Another object of this invention relates to a melting device for regeneration as above, which will make possible the economic use of the heat source, thereby reducing the processing costs.

It is another important object of the present invention to provide a melting device for regenerating scrap iron, having a new preheating casing used effectively in carrying out the aforementioned method.

The operation of the device according to this invention is characterized mainly by having a preheating process for the scrap iron prior to the melting process proper. According to the invention, by applying preheating to scrap iron containing impurities such as moisture, oily matter, refuse, nonferrous metal and the like, said moisture, oily matter and the like, are vaporized; refuses are burnt up; nonferrous metals are melted; and thus such impurities are removed from the scrap iron.

At the same time, thermal energy is maintained in preparation for melting the scrap iron. In this way, preheated scrap iron is successively heated and melted in the melting process and there will be, therefore, no danger of explosion or the like in the melting process under any circumstances. In addition, the time required for melting will be extremely shortened, and thus safe and efficient operation may be carried out.

The heating temperatures in the aforementioned melting process are above the melting point of scrap iron; for example, above 1530° C. in the case of pure iron, and above 1400° C. in the case of steel scraps. Therefore, the melting temperature of scrap-iron materials, including varied kinds of iron materials such as aforementioned, should be above 1530° C. The heating temperatures in the preheating process should be above 100° C., that is the lowest temperature necessary for evaporating moisture, and should also be below the melting point of the scrap iron so that a suitable preheating temperature may be determined within the range of the above temperatures, considering the amount of moisture or impurities on the scrap iron, the heating time, the required operational efficiency, and the like. The highest limitation of said temperature range, that is, the under-melting points of scrap iron, will designate the lowest under-melting point thereof in the case of preheating scrap iron, including iron materials of all kinds. It will be below 1400° C. in the case of scrap iron including said various kinds of iron materials.

In addition, for heating in the aforementioned preheating process, heat sources such as electric heating wires, kerosene or heavy-oil burners, or the like, may be effectively and selectively employed.

The principal feature of the device of this invention is that it comprises a preheating casing, a melting furnace, and duct means which is used for melting in said furnace and inducing the hot air, discharged from the furnace, into the preheating casing. According to the novel features of the device, the discharged hot air is conveyed into the preheating casing through the duct means, and when scrap iron is introduced into said preheating casing and the preheating is applied, moisture, oily matters or nonferrous metals adhering to the scrap iron will thus be removed. Thereafter, the preheated scrap iron is removed from the preheating casing and is introduced into the melting furnace for melting. By so doing, it is needless to say that the danger of an explosion or the like is practically excluded and the melting time is shortened. Owing to the fact that the discharged hot air of the melting furnace is utilized again in the preheating casing, thermal energy is economized by a large margin and will make it possible to lower the costs.

The form of the scrap iron fed into the preheating casing does not have to be loose or unaltered since the recovery thereof; scrap-iron blocks can also be treated according to the inventive method and in the inventive device, which blocks may have gaps or voids between the scrap-iron particles that have been compressed in a preceding procedural step.

As part of the manner in which the scrap iron is heated in the preheating casing by the hot air discharged from the melting furnace, there may also be adopted a radiation system wherein the hot air is passed along or through a radiation path provided inside the preheating chamber, or a direct heating system, whereby the hot air is directly introduced into the casing; also other systems can be employed within the concept of the inventive method and device.

Other objects and advantages in addition to the characteristics, function and advantages of the present invention will become apparent from the following description when taken in connection with the accompanying drawings, wherein—

FIG. 4 is a partial vertical cross-sectional view of a modified radiation chamber, somewhat similar to that shown in FIGS. 1 and 2;

FIG. 5 is a vertical cross-sectional view of a second embodiment of the inventive device, showing a radiation chamber with superposed preheating chamber; and FIG. 6 is a vertical cross-sectional view of a third exemplary embodiment, somewhat similar to that appearing in FIG. 5.

The method for carrying out the preheating process will be explained and discussed after the description of the various exemplary embodiments of the inventive device.

Figure 1:
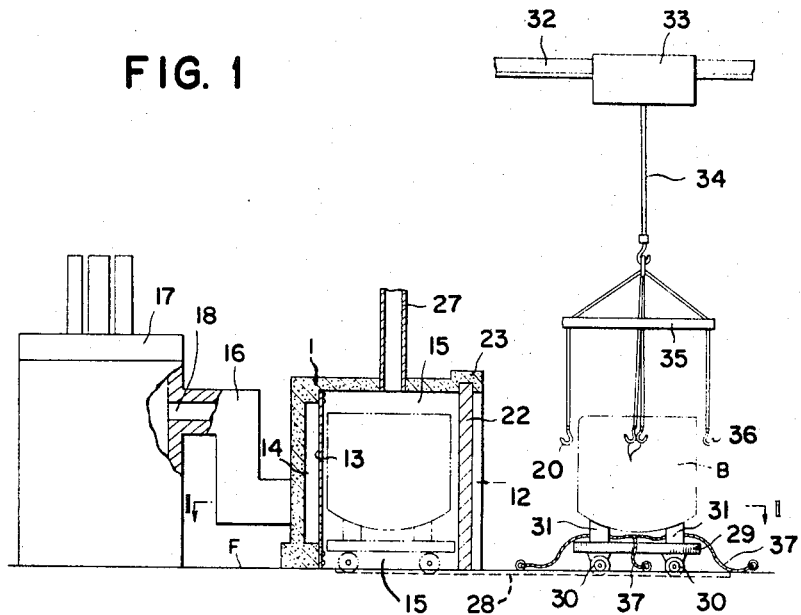
FIG. 1 is a side view of a preferred, first embodiment of the inventive device, for carrying out the inventive method, part of a preheating casing and of an associated furnace being shown in section.
Figure 2:
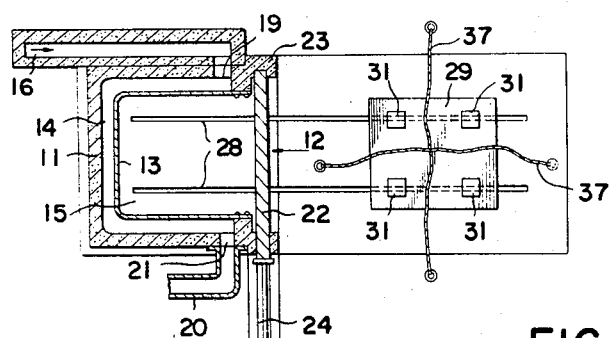
FIG. 2 is a horizontal cross-sectional view of the device, taken on line II—II of FIG. 1.

In the first, preferred embodiment illustrated in FIGS. 1 and 2, a preheating casing 11 is provided on the floor F and has a box shape with an opening 12 on one side. A radiation plate 13, which is preferably a thin iron plate or the like of good heat conductivity, is installed with a small clearance along the three inner walls of the casing 11 so that a radiation chamber 14 is formed around said plate 13, and a preheating chamber 15 is constituted inside the same.

A duct 16 for leading the hot air out of an electric furnace 17 leads from an exhaust port 18 of the furnace to an air inlet 19 on one end of the chamber 14, and an exhaust duct 20 is connected to an exhaust port 21 at the other end thereof. The end of the duct 20 is connected with a conventional smoke collector (not shown), and in this case, it is preferable to connect a fan (also not shown) at a suitable point of the duct 20 to remove, e.g. by suction, the hot air from the chamber 14. In addition, the duct 16 may be made with an adiabatic material such as asbestos cement or the like; the duct 20, however, should not be made with the adiabatic material but, for example, with iron.

A slide door 22 is inserted into a frame 23 of the opening 12, and to one end of the door 22 is connected a ram 24 of a hydraulic cylinder 25 fixed onto the floor F with one or more brackets 26. When hydraulic fluid is made to enter the cylinder 25, the ram 24 will selectively advance and recede, thereby opening and closing the door 22. On the top of the casing 11 there is provided a duct 27 for discharging steam, smoke and the like produced by the preheating, although said duct 27 may be connected to the smoke collector associated with duct 20, in case the exhaust of the furnace 17 contains a great deal of smoke and soot.

Grooves or rails 28 extend in the floor F from the bottom of the preheating chamber 15, and on these rails is located, in freely traveling manner, a trolley 29 having wheels 30, for delivering scrap iron to be preheated. The trolley 29 has four supports 31 on its chassis for carrying a block B of scrap iron, previously compressed by a conventional compressor (the block B is shown in FIG. 1 in dot-dash lines, both inside the chamber 15 and also on the trolley 29, outside the chamber).

Spaced apart from the preheating casing 11, there is provided a traveling crane equipment including an overhead rail 32, a movable gear box 33 and a wire or other rope 34 whose lower end has attached thereto a hanger frame 35 with four hooks 36 suspended thereon. In order to lift the scrap-iron block B with the crane equipment, two ropes 37, preferably made from wire, are placed on the trolley 29 crosswise, as shown in FIG. 2, and both ends of the ropes 37 are hooked on the hooks 36.

Figure 3:
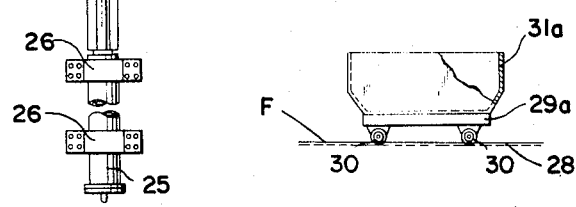
FIG. 3 is a side view of an alternative trolley which can be used with the device of FIGS. 1 and 2.

An alternative trolley embodiment 29a, used in case scrap iron is to be processed which is still loose and uncompressed, is shown in FIG. 3. A bucket 31a is mounted on the chassis of the trolley 29a for receiving the loose scrap iron, the trolley having again wheels 30, as described before, for rolling along the rails 28 shown in FIGS. 1 and 2.

Now the operation and the functions of the previously described preferred embodiment of the inventive device will be described as follows: A scrap-iron block B (or, alternatively, loose scrap iron) is lowered upon the supports 31 of the trolley 29, by making use of the crane equipment 32, 33 as shown in FIG. 1 (if loose scrap iron is to be processed, it will be dropped into the bucket 31a of the alternative trolley embodiment 29a shown in FIG. 3). For the block B, the aforementioned ropes 37 are used which can be disengaged from the hooks 36 and then removed from the block.

Thereafter, hydraulic fluid is supplied to the cylinder 25 so as to open the door 22; the trolley 29 or 29a, carrying the scrap-iron block or material, is wheeled on the rails 28 so as to be placed into the preheating chamber 15, and the door 22 is then closed. The preheating of the scrap iron follows, and details of the operational characteristics will be given somewhat later when the preheating method proper will be explained and discussed in more detail.

The scrap iron preheated in chamber 15 is subsequently placed into the electric furnace 17. When the heating of the furnace sets out, the discharged hot air passes through the duct 16 and flows past the air inlet 19 to the radiation chamber 14, and then passes via exhaust port 21 to the exhaust duct 20, so as to be discharged.

The scrap iron (block B or loose material) is simultaneously heated by the radiant heat of the radiation plate 13. The temperature in the casing 11 reaches, as a matter of example, 600 to 800° C., due to the thermal energy lost during the time needed for guiding and feeding the discharged hot air, provided the heating temperature in the electric furnace 17 is around 1600° C.

When the preheating is finished, the door 22 is opened again and the trolley 29 is pulled out of the casing 11. The wire ropes 37 are then passed again underneath the block B (in the set-up shown in FIG. 1), and the hooks 35 are attached to the crane equipment so as to lift the block B, which is then delivered to a position above the furnace 17, by actuating the crane equipment, and is lowered into the furnace for the subsequent phase of operations, during which a new scrap-iron batch will of course be preheated in chamber 15. The wire ropes 37 may be simply lifted out of the furnace 17 by winding up the rope 34 if at least one end of each rope 37 has been disengaged from the hooks 35.

When the heating of the scrap iron charged into the furnace 17 begins, a fresh scrap-iron block or batch (previously compressed by a compressor, in the case of a block) is delivered aboard the trolley 29 or 29a by said crane equipment and is introduced into the preheating chamber 15 for preheating, as described before.

By carrying out the melting in the furnace 17 and the preheating in chamber 4 substantially simultaneously as hereinabove, on successive batches of scrap-iron materials, the discharged hot air of the furnace 17 will be directly utilized for the preheating so that the electric power as well as the time required for actual melting may be considerably reduced.

A modified radiation chamber is shown in the partial cross-sectional view of FIG. 4, substituting the center portion of the device as shown in FIG. 1. The preheating casing is identified by numeral 41 and has a slide door 42 similar to door 22 of the first embodiment. A number of inner partition walls 43 is arranged in zig-zag fashion, as shown, so as to form a meandering passage between the consecutive walls, within a radiation chamber 44. It will be understood that the walls forming the zig-zag passage could be set off in the horizontal rather than the vertical direction, as shown, with substantially the same result. An air inlet is shown at 49, in a manner similar to inlet 19 of FIG. 2.

Another embodiment of the inventive device will now be described with reference to FIG. 5. A preheating casing 51 has a top opening 52 and defines therein a preheating chamber 55. The top of the casing has a cover 58, pivotally connected at 62 so as to be opened at will.

The casing 51 is preferably cylindrical and has in its lower part four supports 57 for the scrap-iron block B which is to be preheated from the bottom of the cylinder. A radiation plate 53 of good heat conductivity, such as an iron plate or the like, is provided in a position somewhat below the upper ends of the supports 57, thus forming a radiation chamber 54 within the casing 51 and underneath the preheating chamber 55.

A duct 56 for the hot air discharged by the electric furnace (not shown in this figure but substantially the same as shown in FIG. 1 at 17) is connected with an air inlet 59 provided on one side of the chamber 54, while an exhaust duct 60 is connected with an exhaust port 61 on the other side thereof. Chamber 55 has a steam discharging duct 67.

A hydraulic cylinder 63, for opening and closing the cover 58, is rotatably secured to an arm 64 (fastened, for example, to the casing 51) with a pivot pin 65. The cylinder 63 has a ram 66 at its forward end, connected to a bracket 68 of the cover 58, so devised that the latter is selectively opened and closed by controlling the flow of hydraulic fluid into and out of the cylinder 63, thereby moving the ram 66 back and forth. In FIG. 5, the closed position of the cover 58 is shown in solid lines while the open position appears in dot-dash lines, together with the just described actuating mechanism. The attachment of the ram 66 to the bracket 68 may be by way of a pin 69, as illustrated.

In preheating with the second embodiment of the inventive device, when the scrap-iron blocks to be treated have only a small amount of impurities adhering thereto, or only impurities having evaporating or vaporizing capacity, it is preferable to lift the blocks by a wire rope, as in the first embodiment, and to place them directly on the supports 57. However, when there is a substantial amount of impurities or if the latter might have a tendency to drop on the radiation plate 53 upon melting, it is advisable to apply an iron bucket 71 or the like structure on the supports 57, and apply the scrap-iron block B to the former.

Furthermore, in the case of loose scrap iron, the bucket 71 may be replaced by a deeper one (not shown), somewhat similar to bucket 31a of FIG. 3. Such alternative expedients will be self-explanatory to those skilled in the art.

When operating the last-described device, the cover 58 is opened by operating the hydraulic cylinder 63, the scrap iron is lifted up with ropes so as to deliver and drop them with the crane device into the preheating chamber 55. Then preheating is carried out with the cover 58 closed and the ropes remaining in the casing 51. The operation is thereafter carried out in accordance with the examples which will follow somewhat later.

The structure of the radiation chamber 54 in the second embodiment of the inventive device may also be modified, somewhat like in FIG. 4, in respect of its passageway for the hot air, so as to present a zig-zig type path. Also, separation-type and other passageways may be provided (not illustrated) for enhancing the radiation efficiency of the device.

The present invention also provides alternative means for bringing the discharged hot air of the electric furnace into direct contact with the scrap iron to be preheated. A practical, exemplary modification of the FIG. 5 structure would be that shown in the third embodiment of FIG. 6. A preheating casing 81 is similar to casing 51 of the preceding embodiment, and the structural elements 85 to 89, 91, 94, 96 and 97 are substantially identical with the corresponding counterparts 55 to 59, etc. of the previously described device. For the sake of clarity, parts of the cover actuating mechanism have been omitted from FIG. 6.

Instead of the radiation plate 53 of FIG. 5, a disk-shaped member 83 separates the preheating chamber 85 from a radiation chamber 84, in communication with the chamber 85 by way of bores or holes 82 provided in the disk 83, as shown. The lower chamber 84 constitutes a secondary chamber for the upper chamber 85, and the exhaust port and duct 61 and 60, respectively, of FIG. 5 can be dispensed with since the exhaust is made common with that of the chamber 85, in the form of the duct 97. The scrap iron is thus directly heated by the hot air discharged from the electric furnace.

In a further modification, the disk-shaped member 83 may be dispensed with if the structure is desired to be simplified. The supports 87 are of course provided to hold the bucket 91 or the like, for the scrap-iron block B or for loose scrap iron, as has been explained before.

The method for carrying out the preheating process, by way of any of the described exemplary device embodiments, will be explained hereafter in a number of examples.

EXAMPLE 1

The scrap-iron lumps or blocks to be treated are substantially the mixture of iron and steel, and are supplied to the inventive device as they are, including the moisture, paint, machine oil and the like adhering thereto. The lumps or blocks are placed into the preheating casing (of any one of the described embodiments) and heated at about 400° C. for about one hour and 20 minutes, for example by applying the radiant heat of an electric heater wire or the like. By this heating, the moisture is evaporated, while the paint and the machine oil are burnt up or vaporized so that they are removed from the scrap iron.

Hereafter the preheated scrap iron is put into an electric furnace (for example, the one shown in FIG. 1) and heated there for about one hour at 1600° C. so that the scrap iron is completely melted.

EXAMPLE 2

Scrap-iron lumps or blocks may be supplied as steel materials to which ice, paint, machine oil, and also rubber, glass, and/or small amounts of aluminum scrap, galvanized iron adheres. The lumps are put into the preheating casing and are heated directly by a heavy-oil burner at about 700° C. for 50 minutes whereby said impurities will all be completely removed.

The scrap iron is then transferred into the electric furnace where it is heated for about one hour at 1400° C. whereby the scrap iron is completely melted and the thus obtained iron will be of high purity.

EXAMPLE 3

The present example relates to the case wherein the hot air discharged from the melting process proper is used in the heating step of the scrap-iron preheating process.

The scrap-iron lumps or blocks used are a mixture of steel and iron to which moisture, paint and machine oil adheres. Such scrap iron is put into the preheating casing of one of the previously described embodiments and is there heated by the discharged hot air of the exemplary electric furnace of FIG. 1 at about 600° C. for about one hour.

The scrap iron is then placed into the electric furnace and heated there at about 1600° C. for about one hour during which time fresh scrap-iron lumps or a scrap-iron block is preheated in the preheating chamber with the hot air discharged from the furnace.

EXAMPLE 4

This example again relates to the method substantially as described in the preceding Example 3, but with the difference that the scrap-iron material or block is heated by directly applying thereto the hot air discharged from the electric furnace. Thus, the present example is preferably carried out with the exemplary device as shown in FIG. 6, while the more or less indirect preheating process of the preceding example is performed with any one of the devices as shown in FIGS. 1 and 2 as well as 5, including of course in both cases the described modifications.

While particular embodiments of the inventive device, and procedures of the inventive method, have been il-

What I claim is:

1. A device for regenerating recovered scrap iron which has adhering thereto moisture, oily matter, rubber, refuse and/or other non-ferrous substances, the device comprising, in combination, a preheating casing for removing said substances from said scrap iron by heating the same to temperatures above 100° C. but below the melting point of said scrap iron, said casing having an air inlet and a preheating exhaust port, a furnace for melting the preheated scrap iron by heating the same to temperatures above said melting point, said furnace having a furnace exhaust port, and duct means for interconnecting said furnace exhaust port with said air inlet of the casing so as to utilize therein the hot air discharged from said furnace, further comprising rail means and trolley means movable along said rail means, for moving said scrap iron into and out of said casing.

2. The regenerating device as defined in claim 1, wherein said trolley means includes a bucket for receiving said scrap iron in loose form.

3. The regenerating device as defined in claim 1, further comprising a selectively closable and openable door in a wall of said casing, through which said scrap iron is moved.

4. A device for regenerating recovered scrap iron which has adhering thereto moisture, oily matter, rubber, refuse and/or other non-ferrous substances, the device comprising, in combination, a preheating casing for removing said substances from said scrap iron by heating the same to temperatures above 100° C. but below the melting point of said scrap iron, said casing having an air inlet and a preheating exhaust port, a furnace for melting the preheated scrap iron by heating the same to temperatures above said melting point, said furnace having a furnace exhaust port, and duct means for interconnecting said furnace exhaust port with said air inlet of the casing so as to utilize therein the hot air discharged from said furnace, wherein the interior of said casing is divided into a preheating chamber and a radiation chamber, a radiation plate serving as a partition, and wherein said radiation chamber is provided with said air inlet and said preheating exhaust port.

5. The regenerating device as defined in claim 4, wherein said radiation plate includes at least two separate portions defining therebetween a meandering passage for said hot air.

6. The regenerating device as defined in claim 4, wherein said preheating chamber has a selectively closable and openable top cover, allowing said scrap iron to be lowered thereinto and lifted out therefrom.

7. The regenerating device as defined in claim 4, wherein said radiation chamber is disposed underneath said preheating chamber.

8. The regenerating device as defined in claim 7, wherein said radiation plate has perforations allowing said hot air to pass therethrough for sequential passage through said radiation and said preheating chambers.

References Cited
UNITED STATES PATENTS

| | | | |
|---|---|---|---|
| 2,000,664 | 5/1935 | Hayes | 263—36 |
| 3,309,193 | 3/1967 | Bartu | 266—33 |
| 3,337,201 | 8/1967 | Snyder | 266—13 |

J. SPENCER OVERHOLSER, Primary Examiner

J. S. BROWN, Assistant Examiner

U.S. Cl. X.R.

266—33